Figure 1:
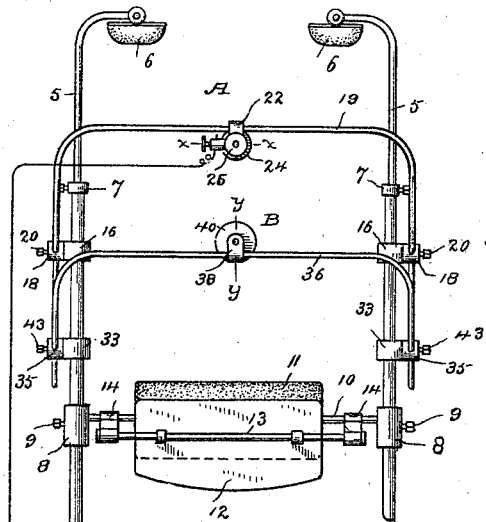

(No Model.)

A. D. WOODRUFF.
APPARATUS FOR TEACHING DIAPHRAGMATIC BREATHING.

No. 537,516. Patented Apr. 16, 1895.

WITNESSES
H. A. Lamb
S. V. Richardson

INVENTOR
Arthur D. Woodruff
By A. M. Wooster
Atty.

UNITED STATES PATENT OFFICE.

ARTHUR D. WOODRUFF, OF NEW YORK, N. Y.

APPARATUS FOR TEACHING DIAPHRAGMATIC BREATHING.

SPECIFICATION forming part of Letters Patent No. 537,516, dated April 16, 1895.

Application filed September 18, 1894. Serial No. 523,388. (No model.)

*To all whom it may concern:*

Be it known that I, ARTHUR D. WOODRUFF, a citizen of the United States, residing at New York, in the county of New York and State of New York, have invented certain new and useful Improvements in Apparatus for Teaching Diaphragmatic Breathing; and I do hereby declare the following to be a full, clear, and exact description of the invention, such as will enable others skilled in the art to which it appertains to make and use the same.

My invention has for its object to produce an apparatus for teaching diaphragmatic breathing.

It is of course well understood that this style of breathing is recommended as a matter of health by all advanced instructors in physical culture as well as by instructors in vocal culture. For good singing a loose throat is necessary and a style of breathing which will remove all unnecessary strain from the vocal cords. To produce this result in the most effective way it is necessary that the upper chest be rounded out, the shoulders held down, the lower abdomen held up and that the breathing be controlled by action of the diaphragm. In so called clavicular breathing, that is, the style of breathing in which the shoulders and collar bones are raised, when the lungs are inflated, the throat is partially closed up and the larynx is put as it were into a vise, and owing to the fact that the larynx does not have free play undue strain is placed upon the vocal cords in producing tones, free vibration of the vocal cords being prevented by the restriction of the larynx. In diaphragmatic breathing, on the other hand the larynx and vocal cords are relieved from all unnecessary strain and the strain is placed upon the diaphragm, which practically controls the breath column, that is the column of air in the trachea, air being supplied to the vocal cords by power applied at the bottom of the breath column by the diaphragm. The difficulty in teaching diaphragmatic breathing is to get the pupils to control the movement of the chest, shoulders and abdomen and at the same time to operate the diaphragm.

In order to teach diaphragmatic breathing I have devised the apparatus hereinafter described by which the shoulders are held down, the lower abdomen is held up and signal mechanism is provided to indicate if the chest is allowed to fall in, thus permitting the pupil to give his entire attention to the diaphragm indicator which can only be operated by operation of the diaphragm thereby leading the pupil without serious effort to fall into the habit of breathing properly, *i. e.*, diaphragmatic breathing.

Figure 2:
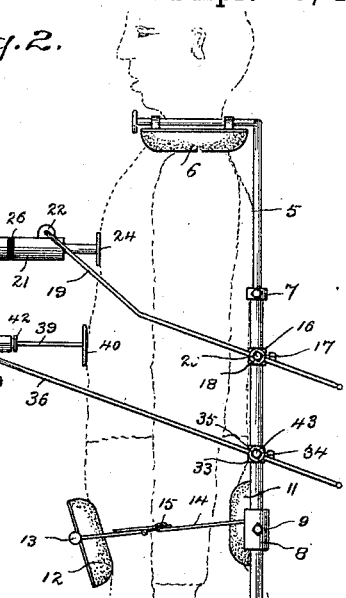
Figure 3:
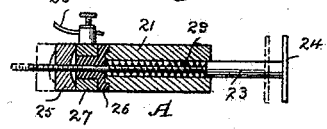
Figure 4:
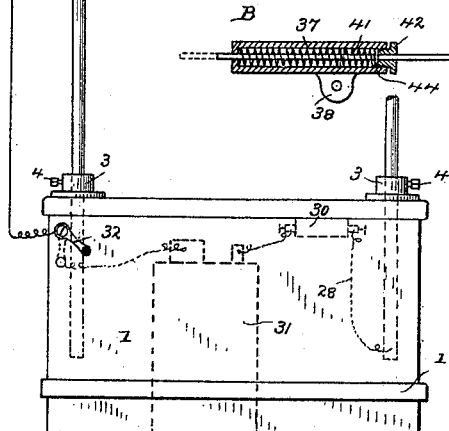

In the accompanying drawings, forming part of this specification, Figure 1 is a front elevation of the apparatus complete; Fig. 2, a side elevation; Fig. 3, a detail sectional view on the line $x\,x$ in Fig. 1, and Fig. 4 is a detail sectional view on the line $y\,y$ in Fig. 1.

1 denotes the base which I ordinarily use although a base may be dispensed with and the pupil may stand on the floor if preferred.

2 denotes standards which are vertically adjustable in collars 3, in which they are locked in position after adjustment by set screws 4. The upper ends of the standards are made hollow to receive rods 5 the upper ends of which are curved inward and carry the shoulder pads 6. Additional vertical adjustment of the shoulder pads may be obtained by sliding the rods up or down in the standards, the rods being locked in position after adjustment by set screws 7.

8 denotes sliding collars on the standards which are locked in position after adjustment by set screws 9 and which have extending between them a cross rod 10 which carries a back pad 11.

12 is an abdominal pad carried by a rod 13 which is connected to the cross rod by straps 14. These straps are made in two parts and are provided with buckles 15 so that the abdominal pad may be drawn up as tightly as may be required, the back of the pupil being supported by the back pad.

16 denotes another pair of collars which slide upon the standards and are locked in position after adjustment by set screws 17 and are provided with hubs 18 having holes through which the ends of a U shaped rod 19 pass, said rod being locked in position after adjustment by set screws 20. This rod carries a chest signal which as a whole is designated as A. This chest signal consists of a body 21 which is attached to U shaped rod 19 in any suitable manner as by a yoke 22. The body is provided with a central opening through which a rod 23 passes, said rod having at its inner end a plate 24 adapted to rest upon the chest of the pupil and its outer end being screw threaded and carrying a nut 25.

26 is a block of insulation rigidly secured to the body at the end opposite to the chest plate and itself carrying a metallic ring 27 to which an electric wire 28 is connected.

29 denotes a spring within the body which acts to hold nut 25 in contact with the ring thus closing the electric circuit, which is indicated in dotted lines in Fig. 1.

30 denotes a signal, as a buzzer, and 31 a battery which I have shown as placed in the base although both parts may be located elsewhere if preferred.

32 denotes a suitable switch by which the circuit may be opened when the apparatus is not in use to prevent waste of current, the switch being shown in full lines in the open position and in dotted lines in the closed position.

33 denotes still another pair of collars on the standards which are locked in position by set screws 34 and are provided with hubs 35 having holes through which the ends of a U shaped rod 36 pass. This rod carries the diaphragm indicator which as a whole I have indicated by B and is locked in position after adjustment by set screws 43. The diaphragm indicator consists of a case 37 which is secured to rod 36 in any suitable manner as by a yoke 38.

39 denotes a rod which passes through the case and is provided at its inner end with a plate 40 which is adapted to rest against the person of the pupil between the floating ribs, the position of the chest signal and the diaphragm indicator in use being indicated approximately in Fig. 2.

Within the case and surrounding the rod is a spring 41 which bears against the outer end of the case and against a collar 44 rigidly secured to the rod, the action being to force the rod and plate 40 inward.

42 denotes a screw plug at the inner end of the case, the rod passing through the outer end of the case and through the screw plug.

The apparatus is usually adjusted in the first instance by an instructor, after which the adjustment does not require to be changed for use by the same pupil.

The chest signal and the diaphragm indicator may or may not be adjusted each time the apparatus is used, preferably however, when once adjusted they are allowed to remain in that position and the only portion of the apparatus that requires to be adjusted each time the apparatus is used is the abdominal pad.

In using the apparatus for the first time the pupil places himself between the standards the small of the back resting against the back pad which is preferably adjusted by the instructor and then locked in place. The shoulder pads are then swung into position and lowered until they rest upon the shoulders firmly enough to prevent the shoulders from being raised in the act of breathing, after which they are locked in position as described. The abdominal pad is drawn up tightly enough, by means of the straps and buckles, to hold the lower abdomen firmly, so as to prevent abdominal breathing. The chest signal is placed at the proper height by moving collars 16 up or down on the standards and is locked in position after adjustment. The operative position of nut 25 is shown in Fig. 2 and by dotted lines in Fig. 3.

It is of course impossible to produce an apparatus that will hold the chest properly rounded out but in my novel apparatus I provide a signal which will instantly sound an alarm if the pupil allows the chest to fall in.

It will be seen in the drawings that in use rod 23 is held out far enough by the rounded chest of the pupil so that plate 25 is held out of contact with ring 27, thus breaking the circuit, it being understood of course that when the apparatus is used the switch is turned to the position shown in dotted lines so that the circuit will be closed by the engagement of nut 25 with ring 26. If the pupil allows the chest to fall in this engagement takes place and the signal sounds which notifies the pupil to round out the chest again. Nut 25 may be adjusted on the rod at any time by simply turning it on the thread. The normal action of the spring is to force the chest plate inward and hold nut 25 in contact with ring 27 as shown in full lines in Fig. 3. The diaphragm indicator simply indicates to the pupil that he is breathing properly as it would be impossible to force rod 39 outward unless the proper movement of the diaphragm was made.

It will be understood from the drawings that the action of spring 41 is to hold plate 40 in contact with the person of the pupil and that the act of breathing will force the plate and rod outward against the power of the spring.

Having thus described my invention, I claim—

1. An apparatus for teaching diaphragmatic breathing consisting essentially of suitable standards, adjustable pads the action of which is to hold the shoulders down an adjustable pad the action of which is to hold up the lower abdomen, an adjustable signal which indicates if the chest is allowed to fall in and an adjustable diaphragm indicator which indicates the movement of the diaphragm in the act of breathing.

2. In an apparatus of the character described the combination with suitable standards, and an adjustable diaphragm indicator which indicates the movement of the diaphragm in the act of breathing, of a spring actuated rod carrying a plate adapted to rest upon the chest of the pupil, a suitable alarm, and electrical connections by which the circuit is closed and the alarm sounded should the chest of the pupil be allowed to fall in.

3. In an apparatus of the character described the combination with suitable standards, of a spring actuated rod carried by said standards said rod having at its inner end a plate adapted to rest against the person of the pupil, said plate and rod being forced outward by expansion of the diaphragm in the act of breathing and moved inward again by the power of the spring when the breath is exhaled.

4. The combination with standards, the abdominal pad and the shoulder pads, of a diaphragm indicator consisting of a spring actuated rod carrying a plate adapted to rest upon the person of the pupil and a chest signal consisting of an electrical circuit, a signal and a spring actuated rod carrying a plate adapted to rest against the chest of the pupil, and suitable connections whereby the circuit is closed and the signal sounded when the plate is allowed to move inward by falling in of the chest.

In testimony whereof I affix my signature in presence of two witnesses.

ARTHUR D. WOODRUFF.

Witnesses:
A. M. WOOSTER,
S. V. RICHARDSON.